Jan. 8, 1963 C. J. KUNZ 3,072,310
TRANSPORT MECHANISMS
Filed July 1, 1960 2 Sheets-Sheet 1

Charles J. Kunz
INVENTOR.
BY R. Frank Smith
Steve W. Grembon
ATTORNEYS

Jan. 8, 1963
C. J. KUNZ
3,072,310
TRANSPORT MECHANISMS
Filed July 1, 1960
2 Sheets-Sheet 2
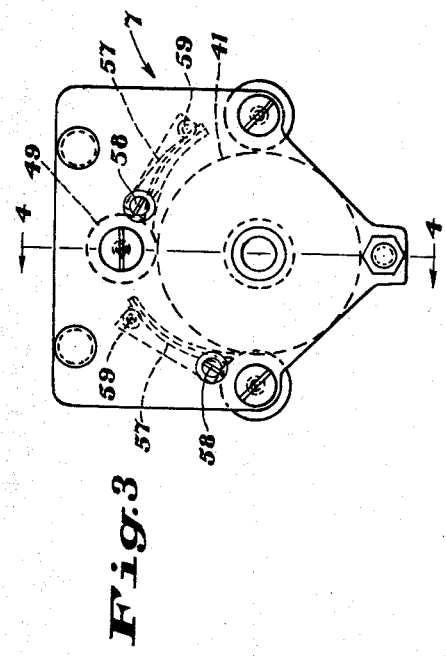
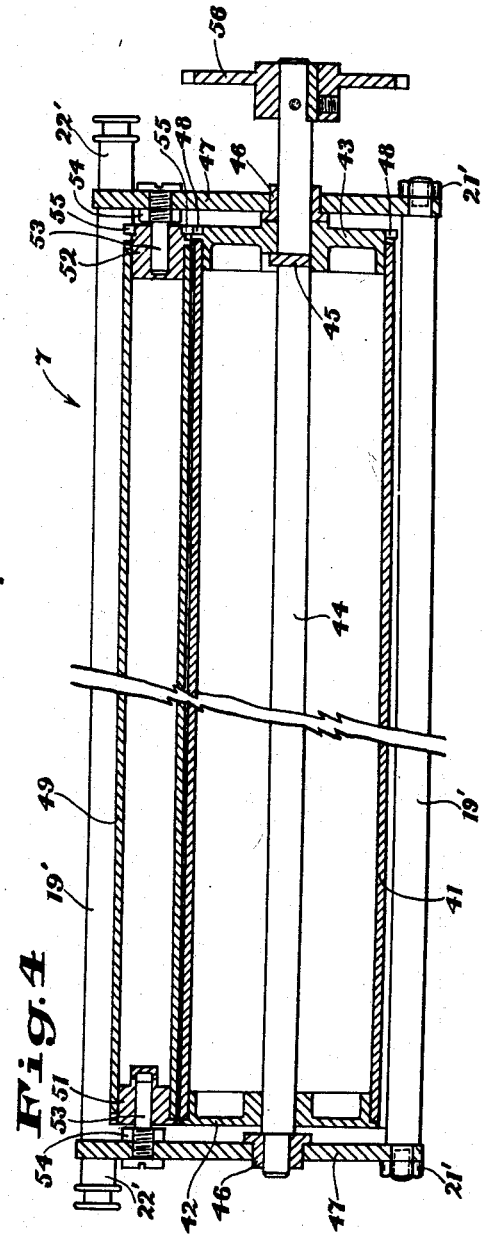
Charles J. Kunz
INVENTOR.
BY
ATTORNEYS

United States Patent Office 3,072,310
Patented Jan. 8, 1963

---

3,072,310
TRANSPORT MECHANISMS
Charles J. Kunz, Rochester, N.Y., assignor to Eastman Kodak Company, Rochester, N.Y., a corporation of New Jersey
Filed July 1, 1960, Ser. No. 40,441
6 Claims. (Cl. 226—188)

This invention relates generally to transport systems, and more specifically to an improved transport mechanism for eliminating the development of slack in a material of the type which is subject to expansion as it is being transported.

In transport mechanisms for transporting a photographic material such as film and paper through a processing solution, the material during processing expands in all directions. In transport mechanisms of the type in which the material is interposed between engageable guide and drive rollers located at spaced intervals in the transport system for substantially locking the material in contact with the drive rollers, slack will develop in the material as it expands since there is no possible way of taking up the additional length of material between any two processing drive rollers. This slack is detrimental in that the transported material will weave from side to side resulting in mistracking of the material. This development of slack in the transported material is eliminated in the improved transport mechanism of this invention by providing a clearance between the guide and drive rollers so that the material transported therebetween is not fixed or locked to the drive roller, and overdriving the guide rollers for developing a force which continuously pushes the material as it expands in the direction of travel of the transported material.

One of the primary objects of the present invention is to provide an improved transport mechanism for transporting a material through a zone in which the material expands without developing any slack therein.

Another object of this invention is to provide an improved transport mechanism for a material in which any slack developed in the material due to expansion is eliminated.

Still another object of this invention is to provide an improved transport mechanism for a material in which side-to-side weaving of the material is eliminated.

A further object of this invention is to provide an improved transport mechanism for a material in which a force is developed for continuously pushing the material in its direction of travel so that any expansion therein is compensated for without the development of slack.

A more specific object of this invention is to provide an improved transport mechanism for a material having guide and drive rollers spaced apart a greater distance than the thickness of the material, and the guide rollers are driven at higher surface velocity than the drive rollers.

Objects and advantages other than those set forth above will be apparent from the following description when read in conjunction with the accompanying drawings, in which:

FIG. 3 is a view similar to FIG. 1 showing a second embodiment of this invention;

FIG. 4 is a section view taken along line 4—4 of FIG. 3; and

Figure 5:
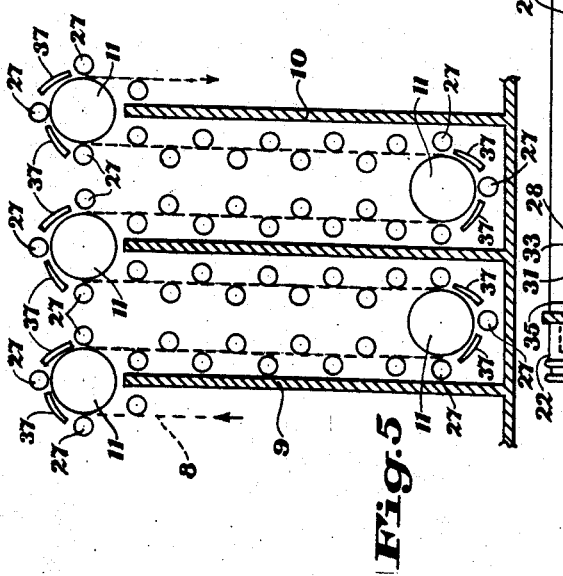
FIG. 5 is a segmental diagrammatic view of a film processor incorporating a transport mechanism of this invention.

As shown in the drawings, the transport mechanisms 6, 7 are designed to transport a material around a curved path. The material referred to may be any web, sheet or the like having the property of expanding as it is being transported. An example of such a material is a photographic film transported through a film processor. As is well konwn, the film expands in all directions during processing. Although only a single transport mechanism is shown in each embodiment, in most transport systems a plurality of these mechanisms would be used at spaced intervals along the path of the transported material. Transport mechanisms of the type shown are particularly suited for transporting a photographic material such as a film 8 or paper through a plurality of adjacent tanks 9, 10 containing processing solutions as seen in FIG. 5.

In such an application, one of the transport mechanisms is mounted near the bottom of each tank for turning the downwardly directed film 8 through an angle of 180° and directing it upwardly in the same tank. Another transport mechanism is mounted above two adjacent tanks for receiving the upwardly directed film 8 from one tank 9, turning it through an angle of 180°, and transporting it downwardly into the next adjacent tank 10. Although this is an example of one application of these transport mechanisms, it should be understood that these transport mechanisms may be adaptable to other uses and applications.

Figure 1:
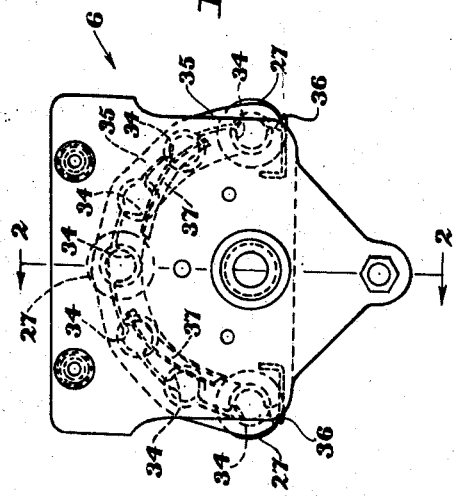
FIG. 1 is an end elevation of a transport mechanism showing one embodiment of this invention.
Figure 2:
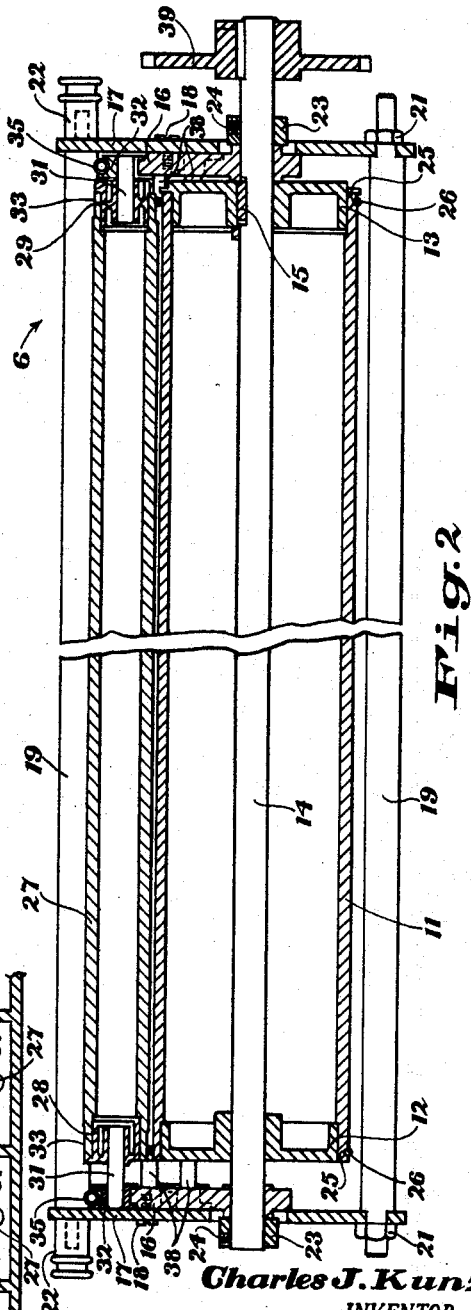
FIG. 2 is a section view taken along line 2—2 of FIG. 1.

In the embodiment of the invention shown in FIGS. 1 and 2, a master roller 11 is shown comprising a cylinder whose ends are mounted on annular disks 12, 13 through which a shaft 14 extends, one of the disks being keyed to shaft 14 by key 15. The shaft is rotatably carried by spaced-apart side flanges 16 which are secured to frame members 17 by screws 18. Frame members 17 are secured together in spaced relation by rods 19 and nuts 21, 22. Nuts 22 are grooved for mounting mechanism 6 to a processor or the like, not shown. Axially spaced retainers 23 are secured to shaft 14 by set screws 24 for preventing axial movement of shaft 14. The master roller 11 is provided at each end with an annular groove 25 for receiving an O ring 26 of rubber or the like. In its mounted position, the outside diameter of O ring 26 is greater than the outside diameter of master roller 11. A plurality of identical smaller rollers 27 referred to in the industry as cluster rollers, are disposed about the periphery of master roller 11. Each roller 27 comprises a tube whose ends are mounted on circular end pieces 28, 29 having axial stub shafts 31 for rotatably supporting pulleys 32. A portion 33 of the ends of roller 27 are of reduced diameter or necked-down, and these necked-down portions 33 are in engagement with O rings 26 of master roller 11. The pulleys 32 seat in semi-circular peripheral recesses 34 formed by side flanges 16 as seen dotted in FIG. 1, and helical springs 35 are wrapped around pulleys 32 and have their ends secured to lugs 36 formed by flanges 16 for urging neck-down portions 33 of cluster rollers 27 into engagement with O rings 26 of master roller 11. When necked-down portions 33 are in engagement with O rings 26, a 0.015 to 0.020-inch clearance exists between master roller 11 and cluster rollers 27 which is somewhat greater than the thickness of the web which is to be transported. A pair of guide shoes 37 shown dotted in FIG. 1 are secured to rods 38 which have pulleys 32 at each end thereof receivable by corresponding recesses 34 in side flanges 16. The shoes 37 are interposed between successive cluster rollers 27 for directing the web between cluster rollers 27 and master roller 11. The master roller 11 is rotatably driven in one direction by a drive gear 39 keyed to shaft 14 which is driven by some suitable drive mechanism, not shown, and in turn drives cluster rollers 27 in the opposite direction by virtue of O rings 26.

In the modification of the invention shown in FIGS. 3 and 4, a master roller 41 is shown comprising a cylinder whose ends are mounted on annular disks 42, 43 through which a shaft 44 extends, one of the disks 43 being keyed to shaft 44 by pin 45. The shaft 44 is rotatably journaled in bearings 46 carried by frame members 47 which are secured together in spaced relation by rods 19' and nuts 21', 22' similar to the modification of FIGS. 1 and 2. Disk 43 further forms a gear 48 having a pitch diameter greater than the outside diameter of master roller 41. A plurality of cluster rollers 49 are mounted about the periphery of master roller 41 and each roller 49 comprises a tube whose ends are mounted on circular end pieces 51, 52 which are rotatably mounted on locating pins 53. The pins 53 are threaded through frame members 47 and locked thereto by lock nuts 54. One of the end pieces 52 of each roller 49 forms a gear 55 adapted to mesh with gear 48 of master roller 41, and gear 48 has a pitch diameter which is less than the outer diameter of cluster rollers 45. The bearings 46 and pins 53 are properly positioned in frame members 47 so that a 0.015–0.020-inch clearance is maintained between rollers 41, 49. This clearance is somewhat greater than the thickness of the web which is to be transported. A pair of guide shoes 57 shown dotted in FIG. 3 are secured to frame members 47 by screws 58, 59 for directing the web between cluster rollers 49 and master roller 41. The master roller 41 is rotatably driven in one direction by a drive gear 56 secured to shaft 44 which is driven by some suitable drive mechanism, not shown, and in turn drives cluster rollers 49 in the opposite direction by virtue of gears 48, 55.

In the operation of this invention, since the outside diameter of O rings 26 and the pitch diameter of gear 48 are greater than the outside diameter of master roller 11, 41 respectively, and the diameter of necked-down portions 33 and the pitch diameter of gear 55 are less than the outside diameter of cluster rollers 27, 49 respectively, rollers 27, 49 will rotate at a higher surface velocity than its corresponding master roller 11, 41. Since the clearance between cluster rollers 27, 49 and respective master rollers 11, 41 exceeds the thickness of the web to be transported, the web is free to move therebetween upon the application of a force thereto. Consequently, cluster rollers 27, 49 which rotate at a faster surface velocity than respective master roller 11, 41 tend to shift the expanding web forward in the direction of travel subjecting the web to a slight tension and preventing the formation of any slack in the transport system.

The invention has been described in detail with particular reference to preferred embodiments thereof, but it will be understood that variations and modifications can be effected within the spirit and scope of the invention as described hereinabove and as defined in the appended claims.

I claim:

1. In a transport mechanism for a web or the like having the property of expanding during transport, the combination comprising; a rotatable master roller having a peripheral surface normally frictionally engaging one face of a web for transporting same; a plurality of subservient rollers disposed around the periphery of said master roller and spaced apart from the periphery thereof by a fixed distance greater than the thickness of said web to be transported, each of said subservient rollers having a peripheral surface frictionally engaging the other face of said web when it expands a given amount for transporting same; and a drive means for driving said master roller and said subservient rollers in opposite directions of rotation, each of said subservient rollers being driven at a surface velocity greater than the surface velocity of said master roller for transporting said web at a greater rate than said master roller to eliminate any slack developed in said web due to such expansion during transport.

2. The invention according to claim 1 wherein resilient means urge said subservient rollers toward said master roller, and said drive means includes O rings mounted on said master roller engageable by necked-down portions of each of said subservient rollers, said outside diameter of said O rings exceeding the outside diameter of said master roller, and the outside diameter of each of said subservient rollers exceeding the outside diameter of its necked-down portion.

3. The invention according to claim 2 wherein said master roller has annular grooves near each end for receiving said O rings, and said necked-down portions are formed at each end of each of said subservient rollers.

4. The invention according to claim 1 wherein said drive means comprises a first gear carried by said master roller meshing with a second gear carried by each of said subservient rollers, the pitch diameter of said first gear exceeding the outside diameter of said master roller, and the outside diameter of each of said subservient rollers exceeding the pitch diameter of its associated second gear.

5. The invention according to claim 1 wherein resilient means urge said subservient rollers toward said master roller, and said drive means includes O rings mounted on said master roller engageable by portions of each of said subservient rollers.

6. In a transport mechanism for a web or the like having the property of expanding during transport, the combination comprising:

(a) primary transport means having a surface frictionally engaging one face of a web for transporting same, (b) secondary transport means spaced apart from said primary transport means a fixed distance greater than the thickness of said web and having a surface frictionally engaging the other face of said web when it expands a given amount for transporting same, and (c) drive means for driving said primary and secondary transport means at different surface speeds, the speed of said secondary transport surface being greater than the speed of said primary transport surface to advance the web at a greater rate for eliminating any slack developed in said web due to such expansion during transport.

References Cited in the file of this patent

UNITED STATES PATENTS

| | | |
|---|---|---|
| 1,718,225 | Funk | June 25, 1929 |
| 2,246,004 | Rich | June 17, 1941 |
| 2,260,128 | Walter | Oct. 21, 1941 |
| 2,501,251 | Zollinger | Mar. 21, 1950 |
| 2,990,092 | Begun et al. | June 27, 1961 |
| 2,995,287 | Namenyi-Katz | Aug. 8, 1961 |